Dec. 30, 1947.    U. MUNSCHAK    2,433,476
HEATING SYSTEM
Filed May 25, 1945    2 Sheets-Sheet 1

INVENTOR.
USCHER MUNSCHAK
BY Richards & Geier
ATTORNEYS

INVENTOR.
USCHER MUNSCHAK
BY Richards & Geier
ATTORNEYS

Patented Dec. 30, 1947

2,433,476

UNITED STATES PATENT OFFICE 2,433,476

HEATING SYSTEM

Uscher Munschak, New York, N. Y.

Application May 25, 1945, Serial No. 595,726

11 Claims. (Cl. 219—46)

This invention relates to an automatic electrical heating system and refers more particularly to means for electrically heating fliers' wearing apparel, such as suits, gloves, shoes and the like. However, the same system may be utilized for blankets, heating pads and various fabrics.

An object of the present invention is the provision of an electrical heating system which will maintain in the articles to be heated an automatically regulated predetermined constant temperature which is independent of temperature variations of the surrounding medium.

Stratosphere flying has made electrically heated wearing apparel an absolute necessity for the personnel. Practical experience has shown, however, that such apparel will be convenient and safe to wear only if it is provided with some means for regulating the heating depending upon the constantly changing temperature of the surrounding air.

Rheostat regulation employed heretofore is unsatisfactory for the following reasons:

In the first place, such rheostats must be mounted in advance upon each airship, which makes the suits and other articles to be heated dependent upon the equipment of the ship.

In the second place, regulation by means of a rheostat is not automatic and demands constant attention on the part of the user; such regulation is merely guess work and does not afford any possibility of maintaining the heating temperature at a constant level for any appreciable period. On the other hand, practical experience has shown that the heating must be continuously regulated depending upon constantly changing outside conditions and the individual peculiarities of the users in order to maintain a more or less constant uniform temperature required for the comfort of the users.

Furthermore, it is most difficult if not impossible to use a single rheostat in an airship for regulating at the same time a plurality of articles, such as the garments of two flyers, their gloves and their shoes, since the manner of heating gloves, for instance, is entirely different from that of heating a garment.

Therefore, another object of the present invention is the provision of an automatic thermo-electric system which will not have the above stated drawbacks.

Other objects of the present invention will become apparent in the course of the following specification.

In accomplishing the objects of the present invention it was found desirable to provide a thermo-electric heating system which contains in itself all elements necessary for the automatic regulation of temperature, so that the articles of apparel to be heated will be independent of the airship equipment.

The heating wires in the article to be heated are arranged elastically, namely, between two layers of lining and are separated from each other by paralleled machine-made lines of stitching. Thus the wires remain movable and pliable.

This arrangement is much better than the prior art sewing of wires to the lining along the entire length of the wires. The additional layer of lining used in accordance with the present invention, protects the wires from damages and helps to maintain a zone of heated air around the wires, thereby delaying their cooling.

It is obvious, however, that other arrangements of wires may be used within the scope of the present invention.

The invention will appear more clearly from the following detailed description when taken in connection with the accompanying drawings showing, by way of example, preferred embodiments of the inventive idea.

In the drawings:

Figure 3 is a diagram of a thermo-electrical system used for automatically regulating the temperature in gloves or the like.

Since articles of wearing apparel for flyers and means for heating them do not constitute per se the subject matter of the present invention, the present specification will describe hereinbelow the following features of the present invention which can be utilized in conjunction with many different types of the above mentioned articles.

(a) Method of regulating the temperature.

(b) Automatic thermo-electrical system.

(c) Method of automatically regulating the temperature in gloves and shoes by the use of elements placed within the garment.

Method of regulating temperature

In order to regulate properly the temperature in the above mentioned articles of apparel, it is necessary that all the separate parts of these articles receive from the heating system an amount of heat energy which provides therein a uniform, constant, previously predetermined temperature independent of the constantly changing temperature of the exterior.

In accordance with the present invention this is attained by providing heating zones between two layers of lining by the use of parallel machine made stitches of equal width which are uniformly distributed throughout the entire surface of the article.

Figure 1:
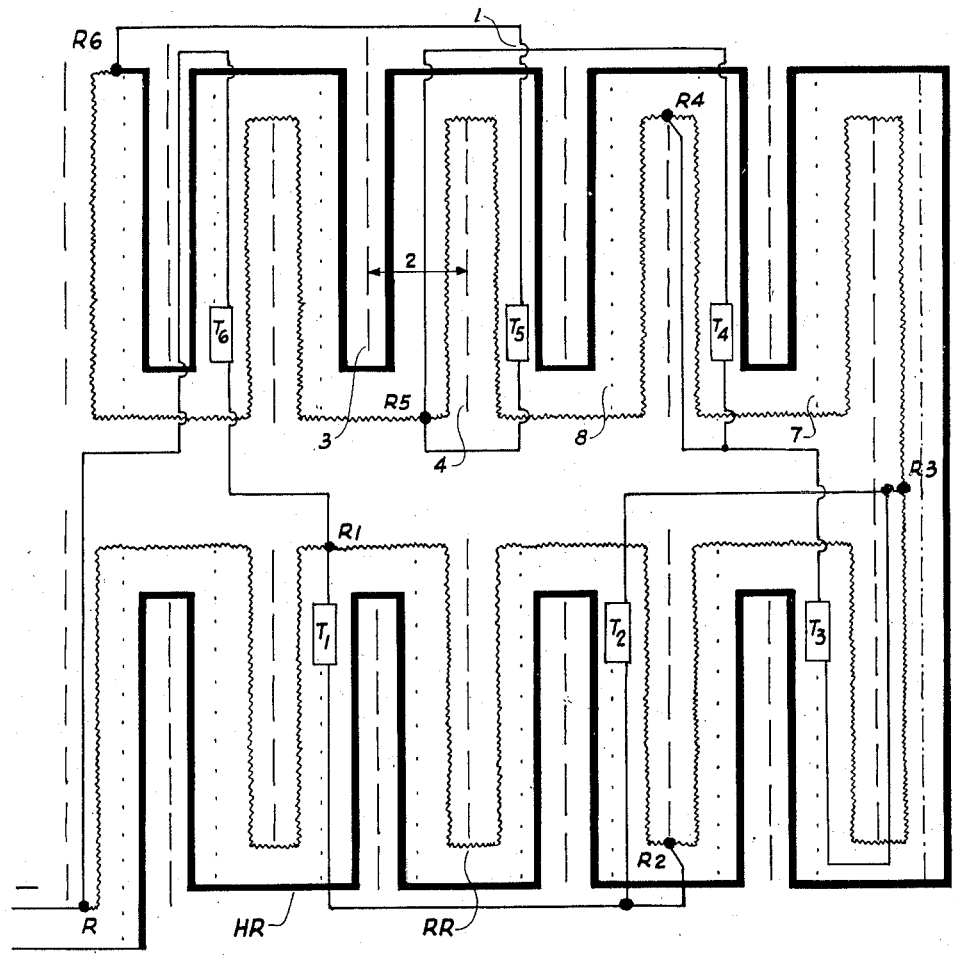
Figure 1 is a diagram illustrating a thermo-electrical heating system constructed in accordance with the principles of the present invention.

In Figure 1, the space 2, enclosed by the lines of stitches 3 and 4 indicated by broken lines forms one heating zone. Other similar heating zones are formed between similar lines of stitching extending on opposite sides of the lines of stitches 3 and 4 indicated by broken lines in Figure 1.

Each of these zones is heated by sections of heating wires HR and RR arranged therein in a manner which will be described hereinafter.

Dotted lines 7 and 8 in Figure 1 also indicate lines of stitching which separate the wires one from the other.

In each of the heating zones the wires create a heating medium the temperature of which is obviously equal throughout the entire length of the zone, provided that the number of watts per foot is the same.

Each of the regulating sectors contains a thermostat T1, or T2, etc., of simple construction the object of which is to regulate the heating medium and to maintain the temperature thereof on a uniform predetermined level independent of variations in the temperature of the outside medium.

Figure 2:
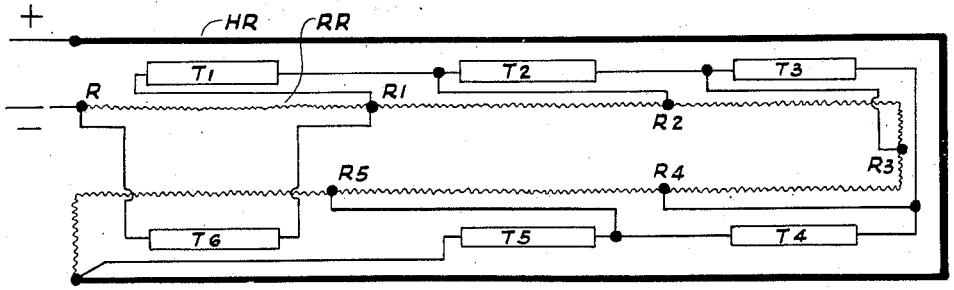
Figure 2 is another diagram illustrating some of the elements shown in Figure 1.
Figure 5:
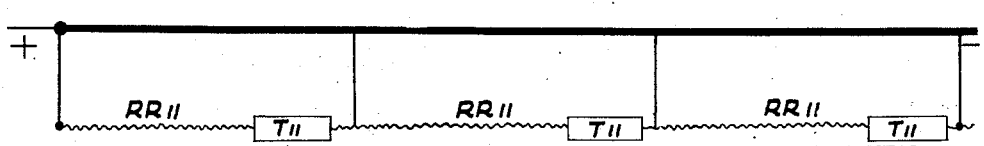
Figure 5 is another diagram showing a differently constructed heating system.

Figures 1 and 2 show six thermostats T1 to T6, while in Figure 5 only three thermostats T are shown in order to simplify the disclosure. Obviously, the number of thermostats may be conveniently varied.

Connecting wires are used to connect the thermostats of the various zones into a single system so that whenever one of the thermostats operates for raising or lowering the temperature of its regulating sector, all other thermostats will be affected immediately, although their operation will be consecutive. Thus a uniform temperature will be maintained automatically in all zones throughout the lining, the thermostats having been set in advance to that temperature.

The danger of breakage of thermostat contacts caused by sparks, particularly in case of a D. C. current and by a thermic reaction in the bi-metal is completely avoided by the present invention since the contacts of the thermostats T1 etc., are switched on and off at a very low voltage not exceeding 3 to 8 volts D. C.; then the sparks are eliminated and the thermostats will operate efficiently and accurately.

Thus the described construction makes it possible to use simple bi-metallic thermostats which have no complicated mechanisms or springs and the contacts of which may be covered by steatite or plastic capsules, and to attain absolutely reliable results with such thermostats.

A thermostat of this type does not weigh more than five to seven grams and occupies a very small space. Thus even six or ten thermostats of this type when attached to the flyer's garment will not inconvenience the wearer and will hardly be felt by him.

Another advantage of the thermo-electric system hereinafter described is that the switching off and on of the contacts in thermostats does not involve a rapid drop in the heating or a quick restoration of the heating; in accordance with the present invention, variations in the heating are very slow, so that the rate of interruptions and engagements of contacts is at a minimum. This has a most beneficial effect upon the proper functioning of the apparatus.

*Automatic thermo-electric system*

Heretofore, the operation of a thermostat caused by a change in the temperature of the medium to be regulated produced complete interruption or restitution of electrical energy, so that heating systems operated only in two positions, namely, full load or no load. A system of this type cannot be used in conjunction with thermostats described herein, since it would involve a too frequent switching off and on of contacts, resulting in a breakage of the thermostats. Furthermore the contacts would then always operate at the full voltage of 24 volts D. C. available in airships, which is not permissible.

In accordance with the present invention these drawbacks are eliminated by the use of a system which adjusts the heating to values between a maximum and certain minimum of heating energy. Thus the supply lines always have the full voltage of 24 volts which is used in aviation, and, as will be hereinafter explained, the switching from maximum to minimum takes place gradually by small stages and the stage voltage in contacts of the thermostats is not higher than 3 to 8 volts. Furthermore, this regulation method does not interrupt suddenly the heating in the zones but merely gradually diminishes that heating, so that the operation of the contacts of the thermostats, is slowed up considerably, thereby prolonging their span of life to a very great extent.

Present day conditions of use of the described aviation garments are such that as soon as the outer temperature has dropped to a level at which the heating system must be switched on, at least a minimum amount of the heating will continue to be necessary, and thus the described method of regulation does not present any inconveniences for the user.

In accordance with the present invention, the heating elements consist of two wires HR and RR which are connected in series. Figure 2 shows these wires in a simplified elongated form, for the sake of clarity of illustration, and also shows the manner of connecting these wires with the thermostats.

The wire HR is the constant heating wire, having an invariable ohmic resistance.

A regulatable wire RR is connected in series with the wire HR and is utilized for heating purposes whenever the contacts of the thermostats T1, T2, T3, T4, etc., are open.

The wire RR is divided into equal sections RR1, R1R2, R2R3, R3R4, etc., the number of which depends upon the number of thermostats which is being used, while the number of the latter is determined by the maximum allowable contact voltage.

Each section of the wire RR is short-circuited by a corresponding thermostat T1, T2, T3, T4, etc.

The combined length of all the sections of the wire RR may be equal to that of the wire HR, but the ohmic resistances of these wires may be different, depending upon the minimum regulated heating: for instance, at a minimum of 50% the ohmic resistances HR and RR are equal to each other, but at a minimum of 25% the ohmic resistance RR is three times greater than the ohmic resistance HR etc.

In the normal position when the heating has just been switched on, the contacts of all the thermostats T1 to T6 are also switched on and the electric current flows through the wire HR and the short circuited thermostats T1 to T6, leaving the wire RR out of the circuit. Then the total resistance of the line is equal to HR.

If now one or more of the thermostats T1 to T6 will open its contacts as a result of an increase in the temperature of the heated medium, then the current will instead of flowing through the thermostat flow through the corresponding portion of the wire RR and the total resistance of the line will be increased by the resistance of that portion of the wire RR.

The same procedure will be repeated in reverse order if one or more of the thermostats T1 to T6 will be switched on as a result of a drop in the temperature of the cooled medium.

It is apparent that whenever the contacts of a thermostat are opened, the total resistance of the line will be increased and the extent of the heating will be correspondingly decreased and vice versa. It is also apparent that the contact voltage prevailing at the contacts of a thermostat while the current is interrupted, in or restored to the shunted portion of the wire RR, is smaller than the voltage prevailing throughout the entire line. The actual amount of this contact voltage will depend upon the total voltage in the line, the number of thermostats in the line and the minimum heating position adapted for the system.

By way of example, let it be assumed that the total line voltage is 24 volts, which is generally adopted for aviation purposes, that there are six thermostats in the line and that the minimum of regulating heating is 33.3%. Then the contact voltage of the first thermostat to be switched off will be equal to six volts, the voltage of the second thermostat will be equal to 4.8 volts, the voltage of the third thermostat will be equal to four volts, the voltage of the fourth thermostat will be equal to 3.4 volts, the voltage of the fifth thermostat will be equal to three volts and the voltage of the sixth thermostat will be equal to 2.33 volts.

Under these conditions the thermostats may be operated indefinitely and without any danger of breakage.

The above constitutes a theoretical description of the heating system, while its practical application will be described hereinbelow. It will become apparent that such heating system particularly in combination with a specific system of positioning thermostats in the sectors to be regulated, provides an excellent solution to the problem of automatic regulation of temperature.

As shown in Figure 1, the space 2 between the lines of machine stitching 3 and 4 constitutes a heating zone which is uniformly distributed throughout the entire surface of the article to heated. The heating wire HR and the regulating wire RR connected in series therewith extend parallel throughout the entire length of that zone between two layers of lining (Figures 1 and 2).

Each sectional heating zone, the length of which corresponds to that of a portion of the wire RR designated as RR1, R1R2, R2R3, etc., and short-circuited by the corresponding thermostat T1, T2, T3, etc., constitutes a separate regulating sector. The number of these regulating sectors correspond to the number of thermostats in the line.

The thermostats are placed in the zones between the wires HR and RR and operate by the influence of the medium in the zone heated by these wires.

The following operations take place when the heating is switched on:

Prior to the heating the temperature in the zones is lower than that to which the thermostats are set, and thus all thermostats will be switched on and, therefore, all the wire sections RR will be short-circuited by the thermostats.

This corresponds to the maximum heating, the electrical current flowing along the wire HR and the thermostats and by-passing the wire RR.

All the thermostats are set in advance to the same predetermined temperature, so that the rise of the temperature in the zones will cause the contacts of the thermostats to open and then the resistance of the regulating wire RR will be included in the general circuit. The heating will be correspondingly diminished.

Minimum heating will take place when all the thermostats will be opened.

The lowering of the temperature in the zones will cause a reverse process; namely, the thermostats will short-circuit the wire portions RR, the resistance in the circuit will drop and the heating will again increase to a maximum.

The following arrangement of the thermostats in the zones (Fig. 2) is necessary for the proper functioning of the system:

Thermostat T1 which short-circuits the wire section R1R2 should be located in the first sector between the wire HR and the wire section RR1.

Thermostat T2 which short-circuits the wire section R2R3 should be located in the second sector between the wire and the wire section R1R2.

Thermostat T3 which short-circuits the wire section R3R4 should be located in the third sector between the wire HR and the wire section R2R3.

Thermostat T4, which short-circuits the wire section R4R5 should be located in the fourth sector between the wire HR and the wire section R3R4.

Thermostat T5 which short-circuits the wire section R5R6 should be located in the fifth sector between the wire HR and the wire section R4R5.

Thermostat T6 which short-circuits the wire section RR1 should be located in sixth sector between the wire HR and the wire section R5R6 and so on.

Since all the thermostats are set to one temperature they will be heated at the same time to the regulating temperature, provided that the extent of the heating is the same in all zones.

In actual practice, however, thermostats will not open all together at one and the same moment. Although the time differential may be quite small, some of the thermostats will open their contacts before others.

Let it be assumed that this thermostat T1 opens its contacts first. Then the wire portion R1R2 will be switched into the circuit so that the resistance in the circuit will be increased and the heating will be decreased. However, the heating will increase in the second sector, since in that sector not only the wire HR, but also the wire portion R1R2 will be heated. Thermostat R2 located in the second sector which was already heated close to the regulating temperature, having received an additional amount of heat from the heated wire R1R2, will immediately open its contacts and switch into the line the wire portion R2R3, and so forth. This cycle will continue until all the thermostats have had their contacts open and until all the wire sections RR have been added to the circuit. At this stage, the extent of the heating will correspond to the regulatable minimum.

If as a result of decreased heating in the circuit the temperature in one of the sectors will drop, a corresponding procedure will take place in the reverse order, as is apparent.

It is possible for some thermostat as a result of a change in temperature in its zone prior to the termination of the cycle to return to its inoperative position; then the adjacent thermostat will carry out its function and the process will continue uniformly until the change from maximum heating, or vice versa, has been completed.

The entire process of changing from maximum to minimum and back again is carried out with a speed which is not lower than that of a modern snap switch.

Therefore, in actual practice the heating system continues to remain in the stable state of maximum or minimum heating and their duration depends upon the outside temperature and its effect upon the zone temperature. Other stages are merely transitory.

The above corresponds to the theoretic assertion that thermostats regulated to the same temperature can maintain the same positions only in case of uniform heating.

During the intermediate stages, namely, when thermostats are in different positions the heating, as above explained, will be different in the various zones and this difference in heating is such that all thermostats will be compelled eventually to change automatically to open or closed positions.

It is apparent that in the described system the heating of the zones will never be interrupted completely and since this will slow up the work of the thermostats, their duration and life span will be greatly increased.

It is apparent that in the described system the thermostats operate as an automatic snap switch which shifts from a maximum heating position to a minimum and vice versa, depending upon variations in the outside temperature. As already stated, the switching is carried out in consecutive stages but with great speed and the stage voltage in the contacts remains within the limits of an acceptable minimum.

Figure 4:
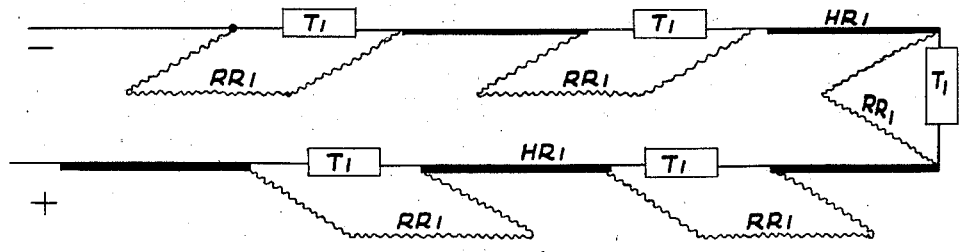
Figure 4 is a diagram illustrating a somewhat differently constructed thermo-electrical heating system.

In certain instances the described device may be changed and substituted by arrangements shown in Figures 4 and 5.

In the modified construction shown in Figure 4 the separate wire sections HR' are connected in series with separate wire sections RR' which are short-circuited by their thermostats T'. Each wire section HR' and the wire section RR' connected therewith constitute a single sector and are located in the same heating zone.

The construction shown in Figure 5 indicates that it is also possible to connect the wire portions HR" and RR" in parallel and to connect the thermostats in series with the corresponding wire portions RR". The separate sectors are then connected in series.

The arrangement of the thermostats remains the same as that in Figures 1 and 2 and the system operates in precisely the same manner, since in all the forms a decreased resistance in the line and an increase in the heating corresponds to a switched in thermostat, while a switched off thermostat causes increased resistance and decreased heating.

This construction makes it possible to divide conveniently the article to be heated into separate parts, such as jacket, trousers, sleeves and the like, and each of these articles of wearing apparel may contain a separate system operating independently and connected in parallel to the circuit.

*Method of automatically regulating the temperature of gloves, shoes, and other articles*

The automatic regulation of temperature inside gloves or shoes may be satisfactorily attained by the use of the described thermoelectric system and thermostats located within these articles. It is inconvenient, however, to place thermostats in articles of apparel which move all the time and, therefore, in accordance with the present invention, a part of the system, namely, the means for automatically regulating the temperature, such as the thermostats, and the regulating wires hereinbefore designated by the letters RR are located outside of the movable articles; for instance, the regulating means for gloves are placed in the sleeves of the flying suit while the regulating means for shoes or boots are placed in the trousers.

Thus the gloves and the shoes may be manufactured in the usual manner, without inserting any regulating attachment, but will be automatically regulated by elements located in the main garment, such as the flying suit. This simplifies the manufacture to a considerable extent.

The thermoelectric system which is used for these articles is the same as those already described, with the exception that the regulating wires hereinbefore designated by the letters RR and their thermostats hereinbefore designated by the letter T are located in sleeves or in trousers.

Figure 3:
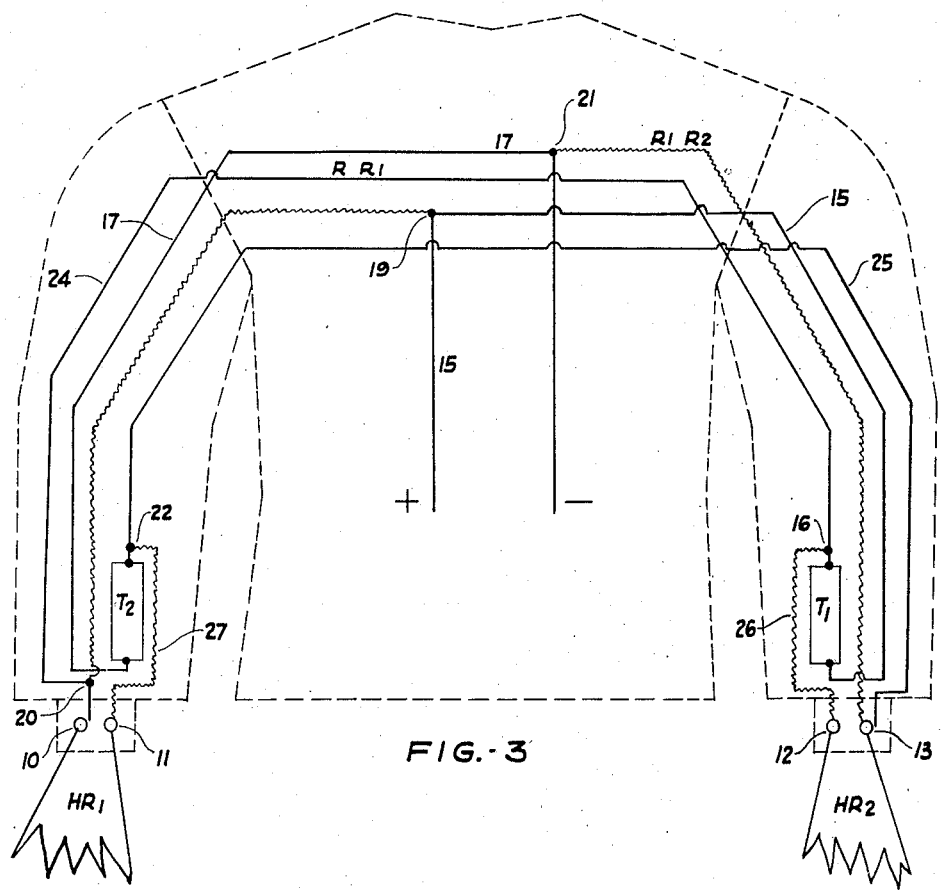

Figure 3 shows diagrammatically the arrangement utilized for this purpose. The heating wires $HR_1$ and $HR_2$ for the two gloves are connected with regulating wires $R_1R_1$ and $R_1R_2$ and the thermostats T2 and T1 at the contacts 10, 11 and 12, 13, respectively.

When the thermostats T1 and T2 are switched on, current will flow from the positive terminal through the wires 15 and 15a, will pass through the thermostat T1 and at the point 16 will branch off to the right hand and left hand gloves namely, to the resistances $HR_1$ and $HR_2$ which are connected in parallel to the circuit. A branch current will flow along the heating wire $HR_2$ in the glove and through the wire 25 to the point 22. Another part of the current will flow through the wires $HR_1$ and 27 to the same point 22. Thence the entire current will flow through the thermostat T2 and the wire 17 to the minus terminal.

Regulating wire $R_1R_1$ is short-circuited by the thermostat T1 and the wires 15 and 24 at the points 19 and 20. The regulating wire $R_1R_2$ is short-circuited by the thermostat T2 at points 21 and 13 and by wires 25 and 17.

The thermostat T1 operates under the influence of the heating resistance 26 which is a continuation of the heating wire $HR_2$, while the thermostat T2 operates under the influence of the heating resistance 27 contstituting a continuation of the heating wire $HR_1$.

In actual practice these two resistances 26 and 27 do not consume more than two to five percent of the total heating of the gloves.

The two thermostats are set to the same temperature chosen for the heating of gloves. The constructor will have the task of so setting the resistances 26 and 27 that with an increase of temperature in the gloves the same increase of temperature will take place in the thermostats. Only in that case will it be possible to attain an automatic regulation of temperature in the gloves upon the same level to which the thermostats had been regulated.

The apparatus will operate in a manner similar to the operation of the suit-heating device:

When the heating is switched on and while the thermostats have not been heated as yet, their contacts will be closed and, therefore, both the wires RR1 and RR2 will be short-circuited: then a maximum current corresponding to the maximum heating will flow through the wire HR.

As soon as one of the thermostats will be heated to the regulating temperature under the influence of wires 26 or 27, the contacts of that thermostat will open. If the thermostat T1 reached that stage then the resistance R1R2 will be switched on into the line and the extent of heating in the circuit will be diminished. The thermostat T2 will receive a thermic shock from the heated wire R1R2 and will maintain open the contacts in the thermostat T1. The resistance RR1 will be now included in the circuits. The heating will again drop to the point at which the thermostats will be cooled sufficiently to short-circuit the resistances RR1 and R1R2. Then the heating will be increased, and so forth.

In actual practice, gloves and shoes do not require more than 10 to 16 watts, and the regulating resistances RR will not consume more than 2 to 3 watts at a heating minimum amounting to 25 or 30% of the maximum, while the stage voltage will not exceed 4 to 6 volts for a line voltage of 24 volts. These conditions are very satisfactory and give excellent results.

The load of the wire RR1 having a length of 3 to 4 feet is less than one watt per foot in the sleeves and suit and is barely noticeable by the wearer. Furthermore, this device will contribute to the general increase of temperature in the sleeves of the suit and will thus affect somewhat the operation of the regulating elements within the suit.

Obviously, the wires in the gloves or shoes may be interconnected in parallel as well as in series.

While the illustrated example shows the application of the system to the regulating of temperature within gloves, the same device may be applied for the regulating of temperature within shoes or boots, the regulating wires RR and the thermostats being located in the trousers of the flying suit in that case.

As above stated, two thermostats are sufficient for the satisfactory heating of a pair of gloves, or a pair of shoes. It is also possible, by applying the same principle, to regulate the heating within shoes as well as gloves by the use of only two thermostats which are attached to the main line and are connected in series with wires within gloves and shoes which are interconnected in parallel.

Other articles of apparel such as the flyer's helmet etc., may be regulated in the same manner.

It is apparent that the invention shown above has been given by way of illustration and not by way of limitation and that the circuits above described are subject to wide variation and modification within the scope of the present invention. All of such variations and modifications are to be included within the scope of the present invention.

What is claimed is:

1. An automatic thermo electrical heating system for providing a predetermined uniform temperature in wearing apparel and other articles, independent of outer temperature variations, said system comprising in combination with an article to be heated having a heated area of uniform width and means separating said area into a plurality of separately regulated sections, a heating element in said sections, a regulating element located in each of said sections parallel to said heating element, all of the said regulating sections being of substantially equal length, a separate thermostat located in each section and set to a predetermined stationary temperature, and means permanently interconnecting said elements and said thermostats for causing in thermostats in all other sections a reaction corresponding to that of a thermostat in any one section resulting from a change in temperature in said one section, whereby any change in temperature in said one section causes consecutively the same change of temperature in all other sections.

2. An automatic thermo electrical heating system for providing a predetermined uniform temperature in wearing apparel and other articles, independent of outer temperature variations, said system comprising in combination with an article to be heated having a heating area of uniform width, and means separating said area into a plurality of separately regulated sections, a heating element extending through all of said sections upon said area of the article to be heated, said heating element having one end adapted to be connected to one terminal of a source of electrical energy, regulating elements in said sections, thermostats in said sections, the thermostat in any one section being connected to the regulating element in that section to short-circuit the same when the thermostat is closed, the regulating elements in said sections being of equal length and interconnected in series, the free end of the regulating element in the first section being connected to the other end of said heating element, the free end of the regulating element of the last section being adapted to be connected to the other terminal of said source of electrical energy, said thermostats being so located in said sections that the elements in any one section heat the thermostat in the following section, while the thermostat in the first section is heated by the elements of the last section, whereby any change in temperature in any one section causes consecutively the same change of temperature in all other sections.

3. An automatic thermo electrical heating system for providing a predetermined uniform temperature in wearing apparel and other articles, independent of outer temperature variations, said system comprising in combination with an article to be heated having a heated area of uniform width and means separating said area into a plurality of separately regulated sections, heating elements in said sections, regulating elements in said sections, a separate thermostat in each section, the heating element in the first section having one end adapted to be connected to one terminal of a source of electrical energy, the thermostat in any one section being permanently connected to the regulating element in that section to short-circuit the same when the thermostat is closed, the heating element in any one section being connected in series with the regulating element in that section, the regulating element in any one section being of equal length and connected in series with the heating element in the following section, the free end of the regulating element of the last section being adapted to be connected to the other terminal of said source of electrical energy, said thermostats being so located in said sections that the elements in any one section heat the thermostat in the following section, while the thermostat in the first section is heated by the elements of the last section, whereby any change in temperature in any one section causes consecutively the same change of temperature in all other sections.

4. An automatic thermo electrical heating system for providing a predetermined uniform temperature in wearing apparel and other articles, independent of outer temperature variations, said system comprising in combination with an article to be heated having a heated area of uniform width and means separating said area into a plurality of separately regulated sections, heating elements in said sections, regulating elements in said sections, a separate thermostat in each section, the regulating element in each section being of equal length and connected in series with the thermostat in said section and said regulating element and said thermostat being connected in parallel with the heating element in said section, the heating elements in the various sections being inter-connected in series, one end of the heating element in the first section being adapted to be connected to one terminal of a source of electrical energy, one end of the heating element in the last section being adapted to be connected to the other terminal of said source of electrical energy, said thermostats being so located in said sections that the elements in any one section heat the thermostat in the following section, while the thermostat in the first section is heated by the elements of the last section, whereby any change in temperature in any one section causes consecutively the same change of temperature in all other sections.

5. An automatic thermo electrical heating system for providing a predetermined uniform temperature in wearing apparel and other articles, independent of outer temperature variations, said system comprising in combination with an article to be heated having a heated area of uniform width and means separating said area into a plurality of separately regulated sections, a heating element in said sections, a regulating element located in said sections parallel to said heating element, a separate thermostat located in each section and set to a predetermined stationary temperature, and means permanently interconnecting said elements and said thermostats and providing maximum heating, the said interconnecting means subdividing the regulating element into sections of equal length, one for each thermostat, minimum heating and at least one intermediate stage for automatically changing the heating system from maximum to minimum and vice versa depending upon temperature variations of the outer medium, the time during which the heating system is at a maximum or minimum being a function of said predetermined stationary temperature of the thermostats and of the temperature of said outer medium.

6. An automatic thermo electrical heating system for providing a predetermined uniform temperature in wearing apparel and other articles, independent of outer temperature variations, said system comprising in combination with an article to be heated having a heated area of uniform width and means separating said area into a plurality of separately regulated sections, a heating element in said sections, a regulating element located in said sections parallel to said heating element, a separate thermostat located in each section and set to a predetermined stationary temperature, means permanently inerconnecting said elements and said thermostats and providing maximum heating, the said interconnecting means subdividing the regulating element into sections of equal length, one for each thermostat, minimum heating and at least one intermediate stage for automatically changing the heating system from maximum to minimum and vice versa depending upon temperature variations of the outer medium, and means connected with said elements for supplying line voltage thereto and maintaining it constant in all stages, the intermediate switching voltage being a fraction of said line voltage.

7. An automatic thermo electrical heating system for providing a predetermined uniform temperature in wearing apparel and other articles, independent of outer temperature variations, said system comprising in combination with heated means, a plurality of separate heating devices automatically and independently heating separate zones constituting a part of said heated means, each of said devices comprising a heating element within the zone heated by said device, a regulating element located within said zone and extending parallel to said heating element, a thermostat located within said zone and set to a predetermined stationary temperature and means permanently interconnecting said elements and said thermostat; the said interconnecting means subdividing the regulating element into sections of equal length, one for each thermostat, a common source of electrical energy, and means connecting said separate heating devices in parallel to said source to form a single aggregate.

8. An automatic thermo electrical heating system for providing a predetermined uniform temperature in wearing apparel and other articles, independent of outer temperature variations, said system comprising in combination with a plurality of articles to be heated, a plurality of heating devices for heating said articles, each of said heating devices having a heating element, a regulating element, all of the regulating elements being of equal predetermined length, a thermostat set to a predetermined temperature, and means permanently interconnecting said elements and said thermostat; and means connecting said heating devices in parallel to a source of electrical energy, the regulating element and the thermostat of at least one of said heating devices being located in another article to be heated.

9. An automatic thermo electrical heating system for providing a predetermined uniform temperature in wearing apparel and other articles, independent of outer temperature variations, said system comprising in combination with a plurality of articles to be heated, a plurality of heating devices for heating said articles, each of said heating devices having a heating element a regulating element, a thermostat set to a predetermined temperature, and means permanently interconnecting said elements and said thermostat; and means connecting said heating devices in parallel to a source of electrical energy, the heating elements of at least two of said heating devices being located in two separate articles to be heated and being interconnected in parallel, the regulating elements and thermostats of said two heating devices being located in a third article to be heated and being connected in series with said heating elements.

10. An automatic thermo electrical heating system for providing a predetermined uniform temperature in wearing apparel and other articles, independent of outer temperature variations, said system comprising in combination with an article to be heated having an area subdivided into a plurality of separated sections in which the temperature is to be separately regulated, a heating element passing through all of said sections, a regulating element passing through the said sections parallel to the heating element, the said heating and regulating elements being connected to each other in series, the ohmic resistance of the regulator element being greater than that of the heating element, a separate thermostat located in each section and set to a predetremined stationary temperature, the said thermostats being connected in series with each other and the heating element and each of said thermostats having one terminal connected to the regulating element so that upon the opening of any of the said thermostats the electric circuit will be completed through the regulating element.

11. A device according to claim 10 wherein the respective regulating elements are of equal length.

USCHER MUNSCHAK.

REFERENCES CITED

The following references are of record in the file of this patent:

UNITED STATES PATENTS

| Number | Name | Date |
|---|---|---|
| 1,152,950 | Hoke | Sept. 7, 1915 |
| 1,402,417 | Hamilton | Jan. 3, 1922 |
| 1,447,031 | Newell | Feb. 27, 1923 |
| 1,744,029 | Burkholder | Jan. 21, 1930 |
| 2,025,302 | Olds | Dec. 24, 1935 |